United States Patent
Fujisawa et al.

(10) Patent No.: US 10,401,230 B2
(45) Date of Patent: Sep. 3, 2019

(54) TEMPERATURE SENSOR AND MOUNTING STRUCTURE FOR SAME

(71) Applicant: DENSO CORPORATION, Kariya, Aichi-pref. (JP)

(72) Inventors: Kazuaki Fujisawa, Kariya (JP); Yoshifumi Watanabe, Kariya (JP); Kouji Hashimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 128 days.

(21) Appl. No.: 15/544,545

(22) PCT Filed: Apr. 4, 2016

(86) PCT No.: PCT/JP2016/001893
§ 371 (c)(1),
(2) Date: Jul. 19, 2017

(87) PCT Pub. No.: WO2016/163109
PCT Pub. Date: Oct. 13, 2016

(65) Prior Publication Data
US 2018/0031427 A1  Feb. 1, 2018

(30) Foreign Application Priority Data
Apr. 8, 2015  (JP) .................................. 2015-079397

(51) Int. Cl.
*G01K 1/08*  (2006.01)
*G01K 13/02*  (2006.01)
(Continued)

(52) U.S. Cl.
CPC ................ *G01K 1/08* (2013.01); *G01K 1/14* (2013.01); *G01K 13/02* (2013.01); *G01K 7/16* (2013.01); *G01K 2201/02* (2013.01)

(58) Field of Classification Search
CPC ............ G01K 1/143; G01K 1/08; G01K 1/14; G01K 13/00; G01K 13/02; G01K 7/00;
(Continued)

(56) References Cited

U.S. PATENT DOCUMENTS 2,290,694 A * 7/1942 Malone .................... G01K 5/64
338/197
3,526,134 A * 9/1970 Schaus .................. G01K 13/02
374/148
(Continued)

FOREIGN PATENT DOCUMENTS

JP  50-027583 A   3/1975
JP  62-203451 U1  12/1987
(Continued)

*Primary Examiner* — Gail Kaplan Verbitsky
(74) *Attorney, Agent, or Firm* — Posz Law Group, PLC

(57) ABSTRACT

A second case includes a projection that projects on an opposite side of a threaded portion of the second case, which is opposite from a first case, while the projection is placed in a passage when the second case is installed to an installation-subject member. An opening is formed in a visible area of an outer peripheral surface of the projection, which is visible at a time of viewing the outer peripheral surface in a flow direction of the measurement-subject medium upon installation of the second case to the installation-subject member, and the projection includes a flow direction changing portion that changes a flow direction of the measurement-subject medium, which is introduced from the passage into an introducing hole through the opening, from a direction along the passage to a direction toward the sensor unit.

9 Claims, 11 Drawing Sheets

(51) Int. Cl.
*G01K 1/14* (2006.01)
*G01K 7/16* (2006.01)

(58) Field of Classification Search
CPC .............. G01K 1/12; G01K 2013/024; G01K 2205/04; G01K 2201/02; G01N 2291/02836
USPC .......................... 374/141, 143, 144, 208, 179
See application file for complete search history.

(56) References Cited

U.S. PATENT DOCUMENTS

| | | | | |
|---|---|---|---|---|
| 5,022,766 | A * | 6/1991 | Phipps | G01K 1/14 236/DIG. 19 |
| 5,241,262 | A * | 8/1993 | Guthrie | G01N 15/12 324/71.1 |
| 5,348,395 | A * | 9/1994 | Corr, II | G01K 1/08 374/135 |
| 5,670,032 | A * | 9/1997 | Friese | G01N 27/407 204/424 |
| 5,871,375 | A * | 2/1999 | Muzslay | G01N 27/407 439/599 |
| 7,841,769 | B2 * | 11/2010 | Ma | F02D 41/1446 374/144 |
| 8,192,078 | B2 * | 6/2012 | Gebauer | G01D 11/24 374/143 |
| 8,256,956 | B2 * | 9/2012 | Suzuki | G01K 13/02 374/163 |
| 9,709,461 | B2 * | 7/2017 | Lenferink | G01K 1/14 |
| 9,841,335 | B2 * | 12/2017 | Rueth | G01L 9/00 |
| 2004/0227636 | A1 * | 11/2004 | Gul | G01K 1/08 340/620 |
| 2005/0038172 | A1 * | 2/2005 | Nimberger | C08L 79/08 524/495 |
| 2016/0011031 | A1 | 1/2016 | Asano et al. | |
| 2017/0045435 | A1 * | 2/2017 | Sugiyama | G01N 15/0656 |
| 2017/0211454 | A1 * | 7/2017 | Matsuoka | G01N 15/0656 |
| 2018/0094989 | A1 * | 4/2018 | Jackson | G01K 7/04 |

FOREIGN PATENT DOCUMENTS

| | | |
|---|---|---|
| JP | 2008-064732 A | 3/2008 |
| JP | 2009-014484 A | 1/2009 |
| JP | 2014-016188 A | 1/2014 |

\* cited by examiner

FLOW DIRECTION OF
SUBJECT MEDIUM

TEMPERATURE SENSOR AND MOUNTING STRUCTURE FOR SAME

CROSS REFERENCE TO RELATED APPLICATIONS

This application is the U.S. national phase of International Patent Application No. PCT/JP2016/001893 filed on Apr. 4, 2016 and is based on and incorporates herein by reference Japanese Patent Application No. 2015-79397 filed on Apr. 8, 2015.

TECHNICAL FIELD

The present disclosure relates to a temperature sensor, which senses a temperature of measurement-subject medium, and a mounting structure of the temperature sensor.

BACKGROUND ART

Previously, for example, the patent literature 1 proposes a pressure sensor. In this pressure sensor, a sensor unit, which outputs a sensor signal corresponding to a pressure, is installed to a case, and a housing is securely swaged against the case to integrate the case and the housing together. Specifically, in this pressure sensor, an introducing hole for introducing the measurement-subject medium is formed in the housing. The sensor unit is installed to the case such that the sensor unit is directly exposed to the measurement-subject medium, which is introduced through the introducing hole. Furthermore, a threaded portion is formed at an outer peripheral surface of the housing.

Here, it is possible to construct a temperature sensor by forming a resistance thermometer element(s), a resistance value of which changes depending on the temperature, at the sensor unit described above to output a sensor signal, which corresponds to the temperature. In this case, as shown in FIG. 14, the temperature sensor may be installed such that a threaded portion J45, which is formed at the housing J40, is threadably joined to a threaded portion J62 of the installation-subject member J61 that has a passage J60, in which the measurement-subject medium flows. When the measurement-subject medium, which flows in the passage J60, is introduced into the introducing hole J42, the sensor signal, which corresponds to the temperature, is outputted from the sensor unit (not shown).

However, the installation structure of the temperature sensor described above may have the following disadvantage. Specifically, a flow direction of the measurement-subject medium in the passage J60 significantly differs (about 90 degrees in the case of FIG. 14) from an inflow direction of the measurement-subject medium from the passage J60 into the introducing hole J42. Therefore, the measurement-subject medium cannot easily enter the introducing hole J42, so that responsiveness of the sensor unit can be easily deteriorated.

CITATION LIST

Patent Literature

Patent Literature 1: JP2009-14484A

SUMMARY OF INVENTION

The present disclosure is made in view of the above point, and it is an objective of the present disclosure to provide a temperature sensor, which can improve responsiveness thereof, and a mounting structure for such a temperature sensor.

In order to achieve the above objective, according to one aspect of the present disclosure, there is provided a temperature sensor including: a casing that includes a first case and a second case, which are integrally assembled, wherein the second case has an introducing hole, into which measurement-subject medium is introduced, and a threaded portion, which is formed in an outer peripheral surface of the second case; and a sensor unit that is placed in an inside of the casing and senses a temperature of the measurement-subject medium, which is introduced through the introducing hole. The threaded portion of the second case is threadably coupled to a threaded portion of an installation-subject member, which has a passage that conducts the measurement-subject medium, so that the casing is installed to the installation-subject member, and the sensor unit senses the temperature of the measurement-subject medium in the passage of the installation-subject member.

The second case is made of a metal material and is kept to have an electric potential that is the same as an electric potential of the installation-subject member by installing the second case to the installation-subject member, while the second case includes a projection that projects on an opposite side of the threaded portion of the second case, which is opposite from the first case. The projection is placed in the passage when the second case is installed to the installation-subject member. When an outer peripheral surface of the projection is viewed in a flow direction of the measurement-subject medium upon installation of the second case to the installation-subject member, an opening is formed in a visible area of the outer peripheral surface of the projection, while the projection includes a flow direction changing portion that changes a flow direction of the measurement-subject medium, which is introduced from the passage into the introducing hole through the opening, from a direction along the passage to a direction toward the sensor unit.

Accordingly, in a state where the temperature sensor is installed to the installation-subject member, the measurement-subject medium, which flows in the passage, is introduced into the introducing hole through the opening, and thereafter a flow direction of the measurement-subject medium is changed by the flow direction changing portion to flow toward the sensor unit. Therefore, the measurement-subject medium can be easily introduced to the sensor unit, and thereby the responsiveness of the sensor unit can be improved.

Furthermore, according to another aspect of the present disclosure, the second case is made of a metal material and is kept to have an electric potential that is the same as an electric potential of the installation-subject member by installing the second case to the installation-subject member, while the second case includes a projection that projects on an opposite side of the threaded portion of the second case, which is opposite from the first case. The projection projects into the passage when the second case is installed to the installation-subject member. When an outer peripheral surface of the projection is viewed in a flow direction of the measurement-subject medium upon installation of the second case to the installation-subject member, an opening is formed in a visible area of the outer peripheral surface of the projection. The sensor unit is located in an inside of the projection and is placed in the passage when the second case is installed to the installation-subject member.

With this configuration, when the measurement-subject medium is introduced into the introducing hole through the opening, the sensor unit is directly exposed to the measurement-subject medium. Thereby, the responsiveness of the sensor unit can be improved.

According to another aspect of the present disclosure, there is provided a temperature sensor installation structure, in which the temperature sensor described above is installed to the installation-subject member. The second case is installed to the installation-subject member such that the projection is placed in the passage.

DESCRIPTION OF EMBODIMENTS

Hereinafter, various embodiments of the present disclosure will be described with reference to the accompanying drawings. In each of the following embodiments, the same portions or equivalent portions will be indicated by the same reference signs.

First Embodiment

A first embodiment of the present disclosure will be described with reference to the drawings. A temperature sensor of the present embodiment is suitable for sensing a temperature of, for example, engine oil.

Figure 1:
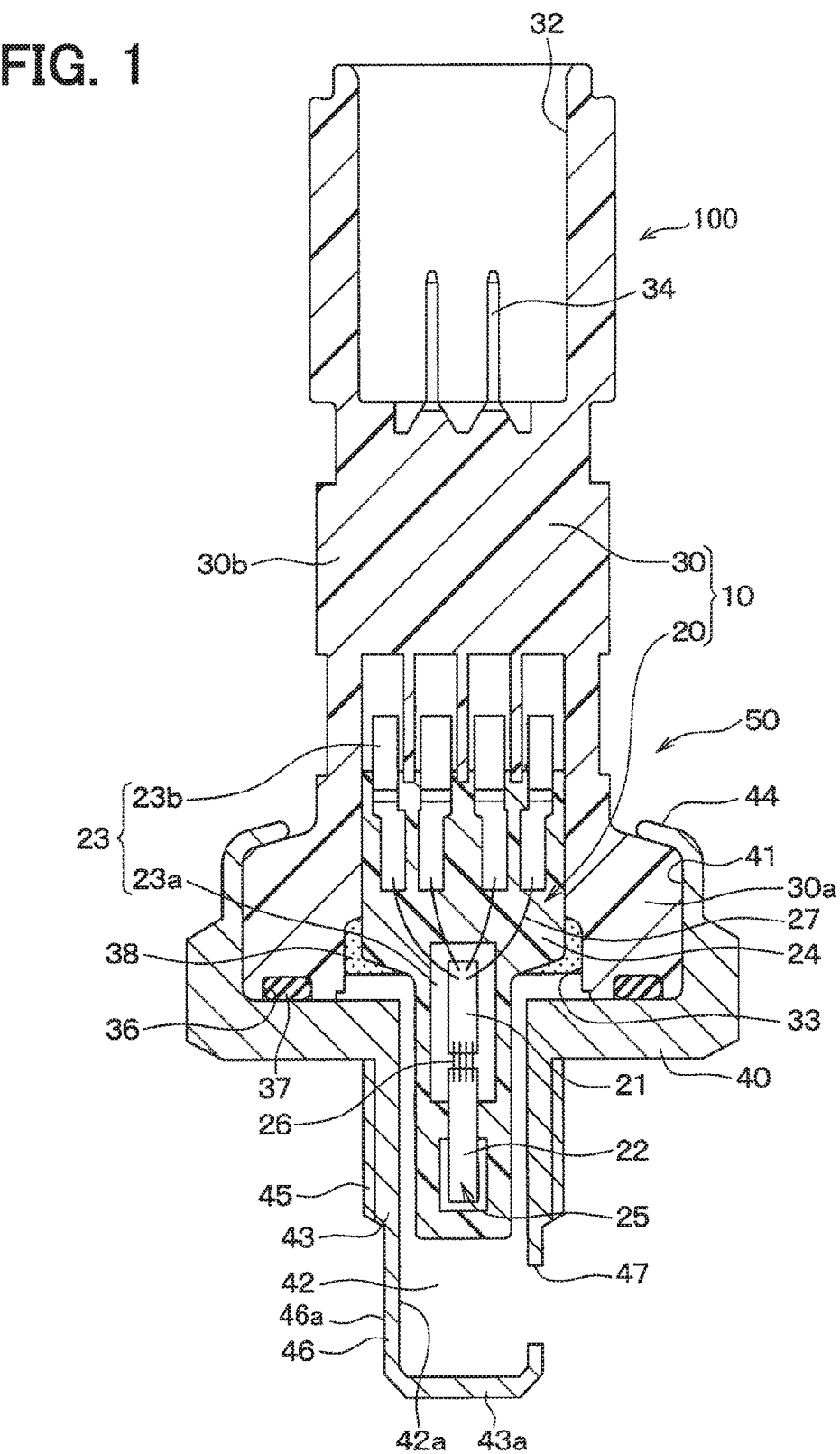
FIG. 1 is a cross-sectional view of a temperature sensor according to a first embodiment of the present disclosure.
Figure 2:
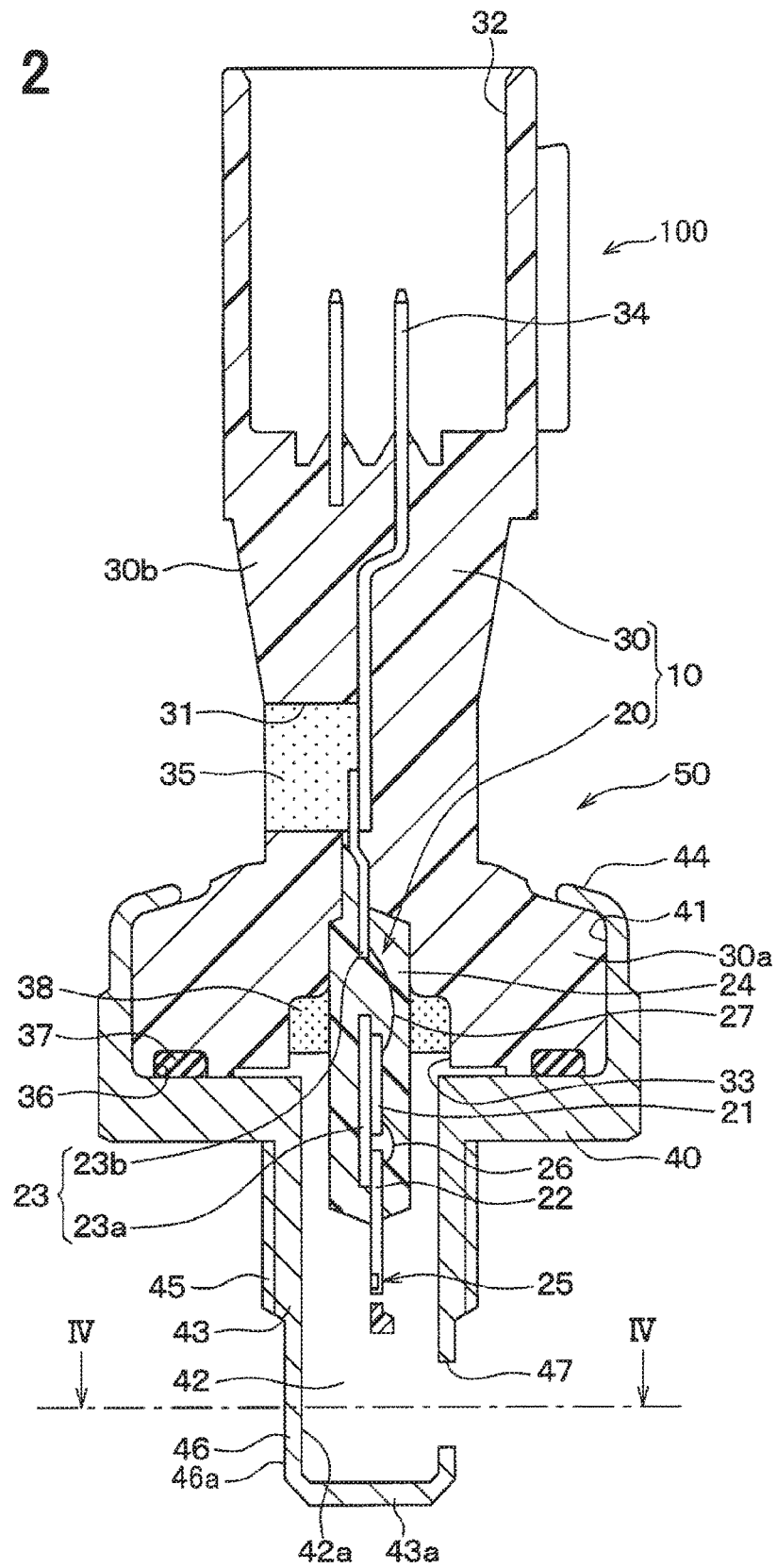
FIG. 2 is a cross-sectional view taken from a different angle that is different from an angle of FIG. 1.

As shown in FIGS. 1 and 2, the temperature sensor 100 includes a connector case 10. The connector case 10 of the present embodiment includes a molded member 20 and a main case 30, which are integrally formed. In the present embodiment, the connector case 10 corresponds to a first case of the present disclosure.

First of all, a structure of the molded member 20 will be described. The molded member 20 includes a circuit device 21, a sensor unit 22, a lead frame 23 and a molding resin 24 while the molding resin 24 seals the circuit device 21, the sensor unit 22 and the lead frame 23.

The circuit device 21 is electrically connected to the sensor unit 22 and executes a drive control operation of the sensor unit 22 and a predetermined process on a sensor signal that is outputted from the sensor unit 22. An IC chip, which includes a semiconductor integrated circuit formed on a silicon substrate, is used as the circuit device 21.

Figure 3:
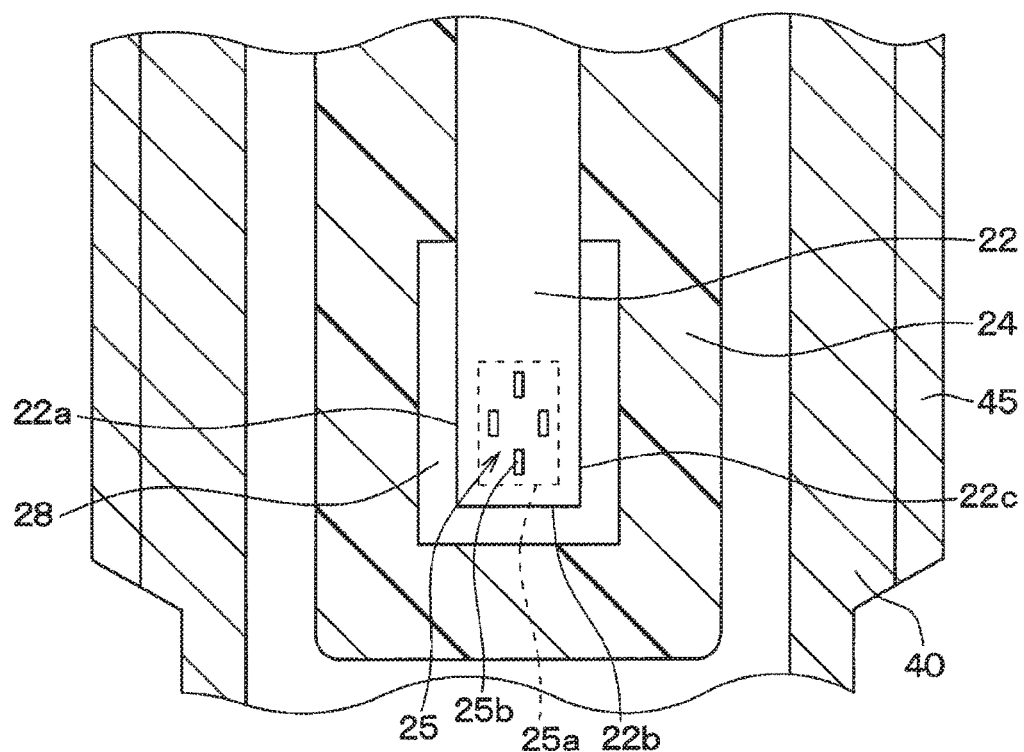
FIG. 3 is an enlarged view around a sensor unit shown in FIG. 1.

The sensor unit 22 is formed by, for example, a silicon substrate and is in a form of a plate member, which is shaped into a planar rectangular form. A sensor chip, which includes a sensing device 25 formed at one end part (a lower side in FIGS. 1 and 2) in a longitudinal direction, is used as the sensor unit 22. As shown in FIG. 3, the sensing device 25 includes a diaphragm portion 25a and resistance thermometer elements 25b. The diaphragm portion 25a is in a form of a thin film. A resistance value of the respective resistance thermometer elements 25b changes in response to deformation of the diaphragm portion 25a and a change in the temperature. Therefore, the sensor unit 22 of the present embodiment outputs a sensor signal, which corresponds to the temperature, and a sensor signal, which corresponds to a pressure. That is, the sensor unit 22 of the present embodiment can sense the temperature and the pressure. Furthermore, pads (not shown), which are electrically connected to the resistance thermometer elements 25b, are formed at the other end part (the upper side in FIGS. 1 and 2) of the sensor unit 22, which is opposite from the sensing device 25.

As shown in FIGS. 1 and 2, the lead frame 23 includes an island portion 23a and lead portions 23b. The circuit device 21 and the other end portion of the sensor unit 22 are mounted to the island portion 23a through a bonding agent. The lead portions 23b serve as terminals for making an electrical connection to an outside. The lead frame 23 is made of metal, such as ordinary Cu or 42Alloy, which shows good electric conductivity, and the lead frame 23 is processed into a predetermined shape through etching processing or press processing.

The circuit device 21 is electrically connected to the pads, which are formed at the other end portion of the sensor unit 22, through bonding wires 26. Furthermore, the circuit device 21 is electrically connected to the one end parts of the lead portions 23b through bonding wires 27. The bonding wires 26, 27 are made of, for example, gold or aluminum.

The circuit device 21, the sensor unit 22, the lead frame 23 and the bonding wires 26, 27 are sealed and integrated together by the molding resin 24. Specifically, these components are integrated by the molding resin 24 such that the one end part of the sensor unit 22, at which the sensing device 25 is formed, is exposed from the molding resin 24, and the other end parts of the lead portions 23b, which are located at the opposite side that is opposite from the one end parts of the lead portions 23b (the side connected to the circuit device 21 through the bonding wires 27), are exposed from the molding resin 24. The molding resin 24 is, for example, ordinary epoxy resin and is molded by, for example, transfer molding method that uses dies.

Furthermore, as discussed above, the sensor unit 22 is the plate member, which is shaped into the planar rectangular form, and the sensor unit 22 is sealed by the molding resin 24 such that the one end part of the sensor unit 22 is exposed from the molding resin 24. However, as shown in FIG. 3, the molding resin 24 is placed around side surfaces 22a-22c of the one end part of the sensor unit 22 such that a gap 28 is interposed between the molding resin 24 and the side surfaces 22a-22c. In this way, the molding resin 24 acts as a cushioning material to limit collision of the side surfaces 22a-22c of the sensor unit 22 against another object at the time of transferring or assembling and thereby to limit a chipping at the side surfaces 22a-22c of the sensor unit 22 caused by the collision. Furthermore, since the molding resin 24 is placed around the side surfaces 22a-22c of the sensor unit 22 while the gap 28 is interposed between the molding resin 24 and the side surfaces 22a-22c, it is possible to limit conduction of a stress from the molding resin 24 to the sensing device 25.

Here, it should be noted that the molding resin 24 is not placed at one surface of the distal end part of the sensor unit 22, which extends perpendicular to the side surfaces 22a-22c, and an opposite surface of the distal end part of the sensor unit 22, which is opposite from the one surface. Furthermore, the gap 28, which is located between the molding resin 24 and the side surfaces 22a-22c of the sensor unit 22, is formed by, for example, laser processing after the molding resin 24 is formed such that the side surfaces 22a-22c of the sensor unit 22 are sealed by the molding resin 24. The structure of the molded member 20 has been described above.

As shown in FIGS. 1 and 2, the main case 30 is formed by molding resin, such as PPS (polyphenylene sulfide) or PBT (polybutylene terephthalate) with dies. The main case 30 includes a body portion 30a and a connector portion 30b. The body portion 30a is shaped into a cylindrical form. The connector portion 30b is shaped into a cylindrical form that extends upward from the body portion 30a and has a reduced diameter, which is reduced at a connection to the body portion 30a.

A recess 31 (see FIG. 2) is formed in an outer peripheral surface of a part of the connector portion 30b that is located at the side where the connection of the connector portion 30b, which is connected to the body portion 30a, is placed. Furthermore, an opening 32 is formed at an opposite end part of the connector portion 30b, which is opposite from the body portion 30a. A through-hole 33 is formed in the body portion 30a. The through-hole 33 extends from an opposite end part of the body portion 30a, which is opposite from the connector portion 30b, and the through-hole 33 is communicated with a space in the recess 31.

Furthermore, the main case 30 includes a plurality of terminals 34, each of which is made of metal and is shaped into a rod form, to electrically connect the sensor unit 22 to, for example, an external circuit. Each of the terminals 34 are integrally molded together with the main case 30 by insert molding, so that each of the terminals 34 is held in the inside of the main case 30.

Specifically, each of the terminals 34 is held by the main case 30 such that one end part of the terminal 34 is exposed in the inside of the recess 31 at the main case 30, and the other end part of the terminal 34 projects into the opening 32 at the terminal 34. The other end part of the terminal 34, which projects into the opening 32, is electrically connected to, for example, the external circuit through an external wiring member, such as a wire harness (not shown). The structure of the main case 30 has been described above.

The connector case 10 is formed such that the molded member 20 is press fitted into the through-hole 33 that is formed in the main case 30. Specifically, the molded member 20 is press fitted into the through-hole 33 of the main case 30 such that the other end parts of the lead portions 23b are exposed in the recess 31, and the one end part (the sensing device 25) of the sensor unit 22 projects outward toward the opposite side of the body portion 30a, which is opposite from the main case 30.

In the recess 31, the one end part of each terminal 34 is electrically connected to the other end part of the corresponding lead portion 23b through, for example, welding. In this way, the sensor unit 22 is electrically connected to the terminals 34 through the circuit device 21 and the lead portions 23b, so that the sensor unit 22 is connected to the external circuit. Furthermore, a potting material 35, which protects a welded joint between the one end part of each terminal 34 and the other end part of the corresponding lead portion 23b, is placed in the recess 31 (see FIG. 2).

Furthermore, in the main case 30, a groove 36 is formed at the opposite end part of the body portion 30a, which is opposite from the connector portion 30b, such that the groove 36 is in a ring form that surrounds the through-hole 33, and an O-ring 37 is placed in the groove 36.

Furthermore, a potting material 38 is placed between the molded member 20 and the main case 30 to seal a gap between the molded member 20 and the main case 30. The structure of the main case 30 has been described above.

When the housing 40 is assembled to the connector case 10, the casing 50 is formed, and there is formed the temperature sensor 100, in which the sensor unit 22 is placed in the casing 50. Specifically, the housing 40 is formed through cutting and/or cold forging of a metal material, such as stainless steel, SUS or aluminum. The housing 40 includes a receiving recess 41 and an extending portion 43, and an introducing hole 42, which is communicated with the receiving recess 41, is formed in the extending portion 43. The body portion 30a of the connector case 10 is inserted into the receiving recess 41 such that the sensor unit 22 is placed in the introducing hole 42, and an opening end part 44 of the receiving recess 41 of the housing 40 is swaged against the body portion 30a. Thereby, the connector case 10 and the housing 40 are assembled together.

In the present embodiment, the housing 40 corresponds to a second case of the present disclosure. Furthermore, the O-ring 37, which is placed in the groove 36 of the main case 30, is compressed by a swaging pressure that is exerted at the time of swaging the housing 40 against the connector case 10. In this way, leakage of the measurement-subject medium, which is introduced into the introducing hole 42, through a gap between the connector case 10 and the housing 40 is limited.

The extending portion 43 is shaped into a bottomed cylindrical tubular form such that a cover portion 43a is formed at a projecting distal end part (a distal end part that is opposite from the connector case 10 side) of the extending portion 43. A threaded portion 45, which is used to fix the housing 40 (the temperature sensor 100) to a installation-subject member 61, is formed at an outer peripheral surface of the extending portion 43. Furthermore, in the extending portion 43, a plurality of openings 47 is formed at a projection 46 that is located on an opposite side of the threaded portion 45, which is opposite from the connector case 10.

Figure 4:
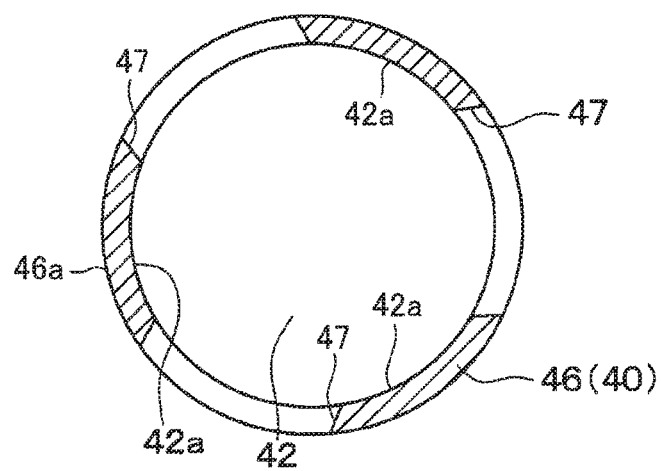
FIG. 4 is a cross-sectional view taken along line IV-IV in FIG. 2.

In the present embodiment, the openings 47 are respectively shaped into an ellipse form. Furthermore, as shown in FIG. 4, in the present embodiment, the number of the openings 47 is three (even number), and these three openings 47 are arranged one after another at equal intervals in a circumferential direction about a central axis (or simply referred to as an axis) O of the projection 46. The projection 46 includes a flow direction changing portion (a flow direction changing means) that changes a flow direction of the measurement-subject medium in a direction toward the sensor unit 22.

In the present embodiment, the projection 46 includes a wall surface 42a, which forms an introducing hole 42, in at least a part of a portion of the projection 46 that is opposed to a corresponding one of the openings 47 in a corresponding direction, which is perpendicular to the central axis O. That is, the openings 47 are formed such that at least the part of the portion of the projection 46, which is opposed to the corresponding one of the openings 47, is left in the projection 46. In the present embodiment, this wall surface 42a corresponds to the flow direction changing portion of the present disclosure.

In the present embodiment, all of the openings 47 are equally sized. Furthermore, the openings 47 are formed by, for example, press processing and/or cutting. In the case where the openings 47 are formed by the press processing, an auxiliary hole, which receives a jig used at the time of press processing, is formed before the time of forming the openings 47, so that the openings 47 can be easily formed by using the auxiliary hole.

Figure 5:
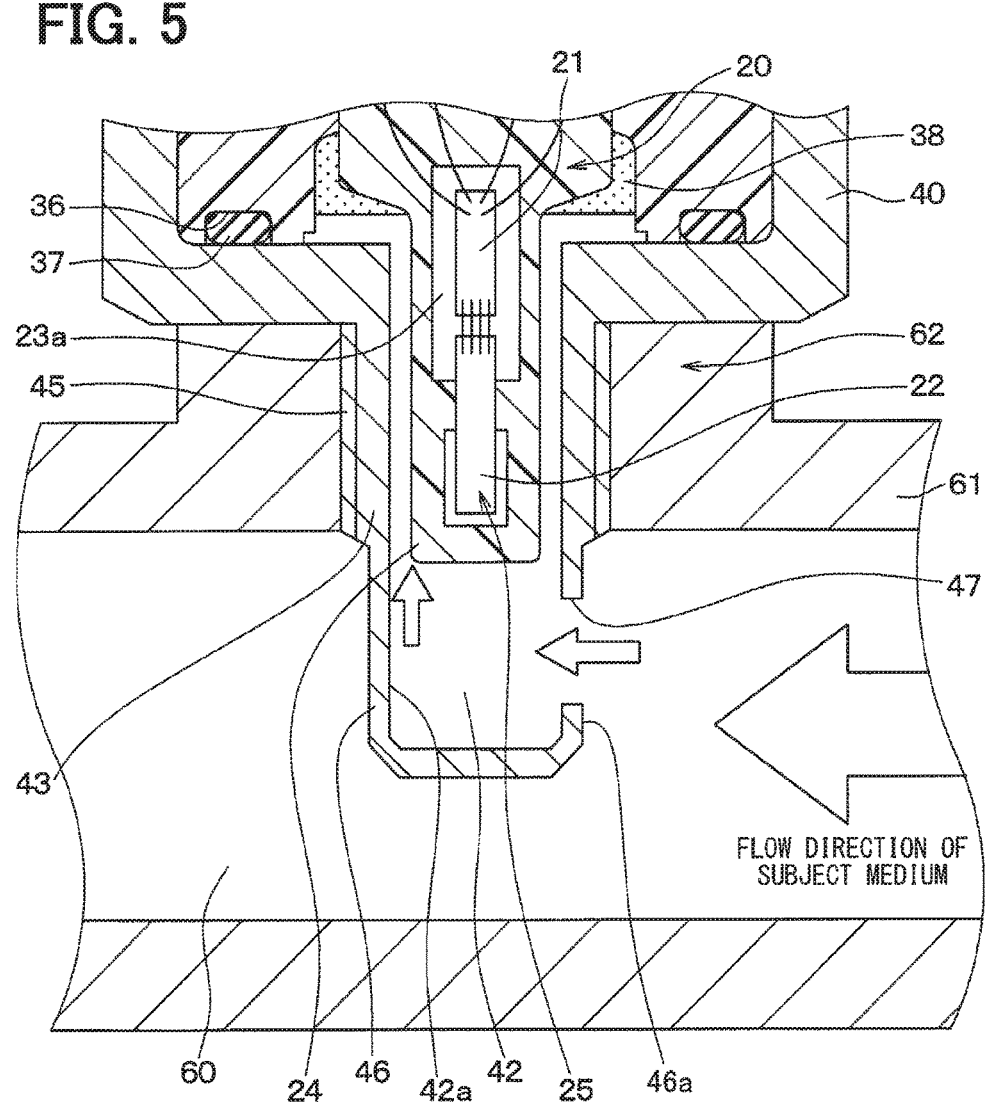
FIG. 5 is a cross-sectional view showing the temperature sensor of the first embodiment installed to an installation-subject member.

As shown in FIG. 5, the temperature sensor 100 is installed to the installation-subject member 61 that includes a passage 60. Specifically, a threaded portion (a female-threaded portion) 62 of the installation-subject member 61 is threadably joined to the threaded portion (the male-threaded portion) 45 of the housing 40 such that the projection 46 of the extending portion 43 is placed in the inside of the passage 60. Thereby, the temperature sensor 100 is installed to the installation-subject member 61. In this way, since the housing 40 is made of the metal material, the housing 40 is kept to have an electric potential that is the same as an electric potential of the installation-subject member 61.

Furthermore, the opening 47 is placed at the upstream side in the flow direction of the measurement-subject medium when the temperature sensor 100 (the housing 40) is installed to the installation-subject member 61. In other words, the opening 47 is formed in a visible area of the outer peripheral surface 46a of the projection 46, which is visible at the time of viewing the outer peripheral surface 46a in the flow direction of the measurement-subject medium upon installation of the temperature sensor 100 (the housing 40) to the installation-subject member 61. In the present embodiment, the number of the openings 47 is three, and the temperature sensor 100 is installed such that one of the three openings 47 is placed in the visible area of the outer peripheral surface 46a. In the present embodiment, the number of the openings 47 is three, and these three openings 47 are arranged one after another at equal intervals. Therefore, one of the three openings 47 must be placed in the visible area of the outer peripheral surface 46a without a need for precise positioning of the openings 47.

When the temperature sensor 100 is installed to the installation-subject member 61 in the above-described manner, the measurement-subject medium, which flows in the passage 60, is introduced into the introducing hole 42 through the opening 47. Then, when the measurement-subject medium collides against the wall surface 42a, the flow direction of the measurement-subject medium is changed to a direction toward the sensor unit 22. Therefore, the measurement-subject medium can be easily introduced to the sensor unit 22, and thereby the responsiveness of the sensor unit 22 can be improved.

As discussed above, according to the present embodiment, the openings 47 are formed at the projection 46 of the housing 40, and the projection 46 includes the wall surface 42a that serves as the flow direction changing portion (the flow direction changing means), which changes the flow direction of the measurement-subject medium toward the sensor unit 22. Therefore, when the measurement-subject medium, which flows in the passage 60, is introduced into the introducing hole 42 through the opening 47, the measurement-subject medium collides against the wall surface 42a. Thereby, the flow direction of the measurement-subject medium is changed to the direction toward the sensor unit 22. Therefore, the introduction of the measurement-subject medium to the sensor unit 22 is eased, and thereby the responsiveness of the sensor unit 22 can be improved.

Figure 6:
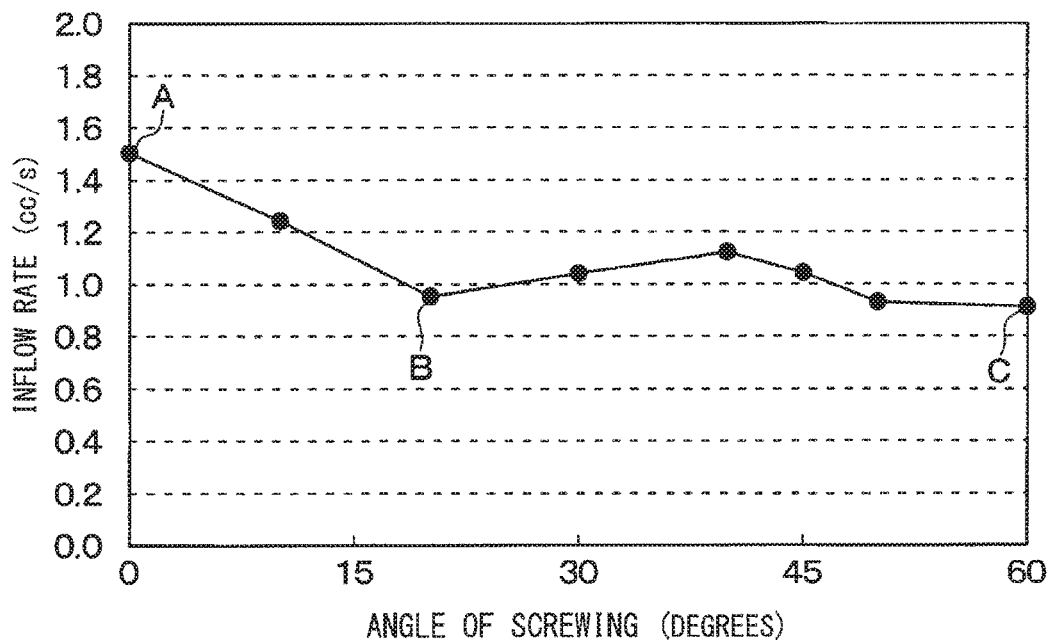
FIG. 6 is a diagram indicating a simulation result that shows a relationship between an angle of screwing and an inflow rate.
Figure 14:
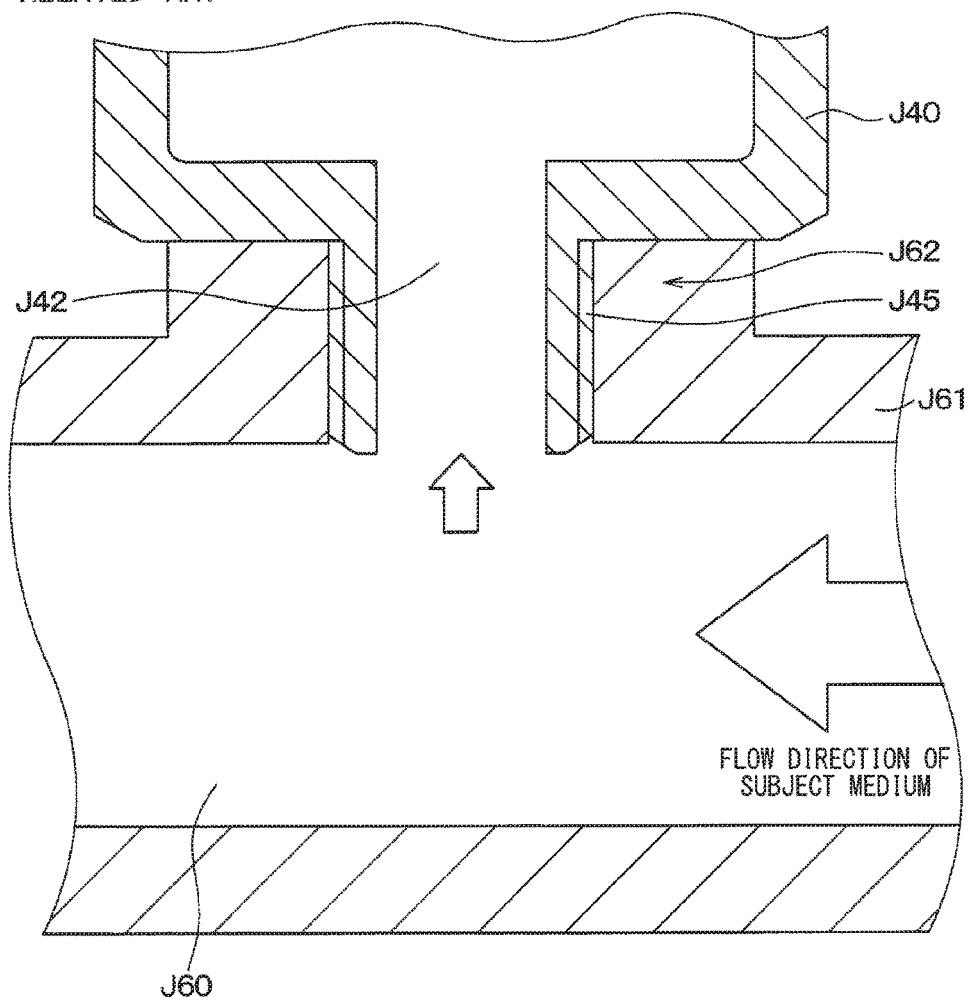
FIG. 14 is a diagram for describing an objective of the present disclosure.

Hereinafter, this point will be specifically described with reference to FIGS. 6 and 7A-7C. FIG. 6 shows a result of a simulation that is executed under the same condition as a condition where an inflow rate of the measurement-subject medium into the introducing hole 42 is set to be 0.13 cc/s in the previously proposed temperature sensor (see FIG. 14) where the cover portion 43a is not provided at the distal end of the introducing hole 42, and the openings 47 are not formed, and the measurement-subject medium is introduced into the introducing hole 42 only through the distal end of the introducing hole 42.

Figure 7A:
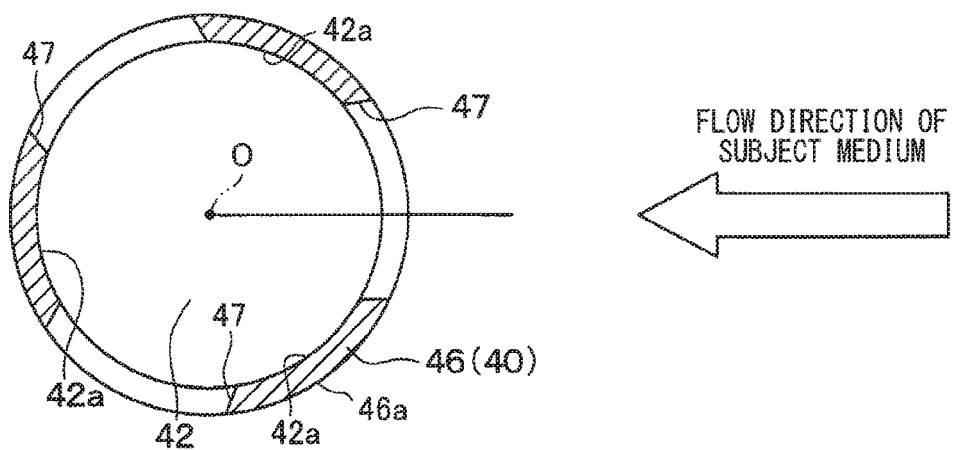
FIG. 7A is a diagram that indicates a positional relationship between openings at a point A in FIG. 6 and a flow direction of measurement-subject medium.
Figure 7B:
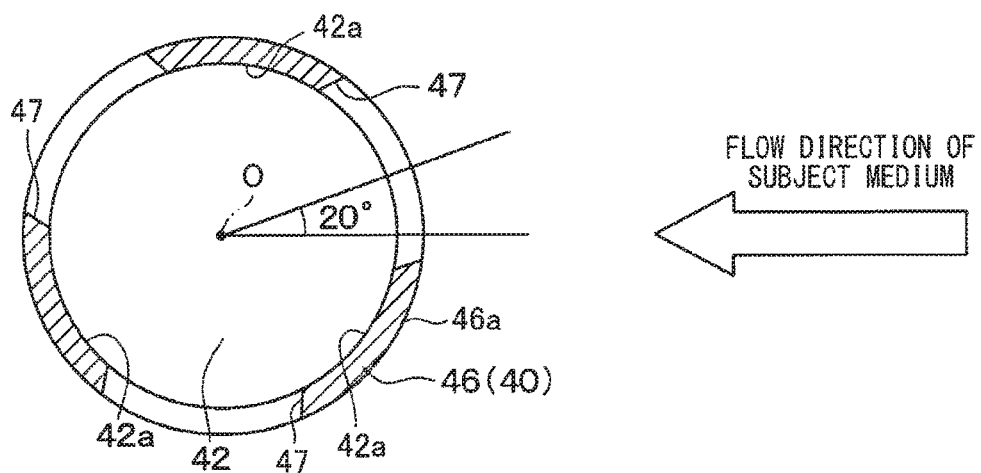
FIG. 7B is a diagram that indicates a positional relationship between the openings at a point B in FIG. 6 and a flow direction of the measurement-subject medium.
Figure 7C:
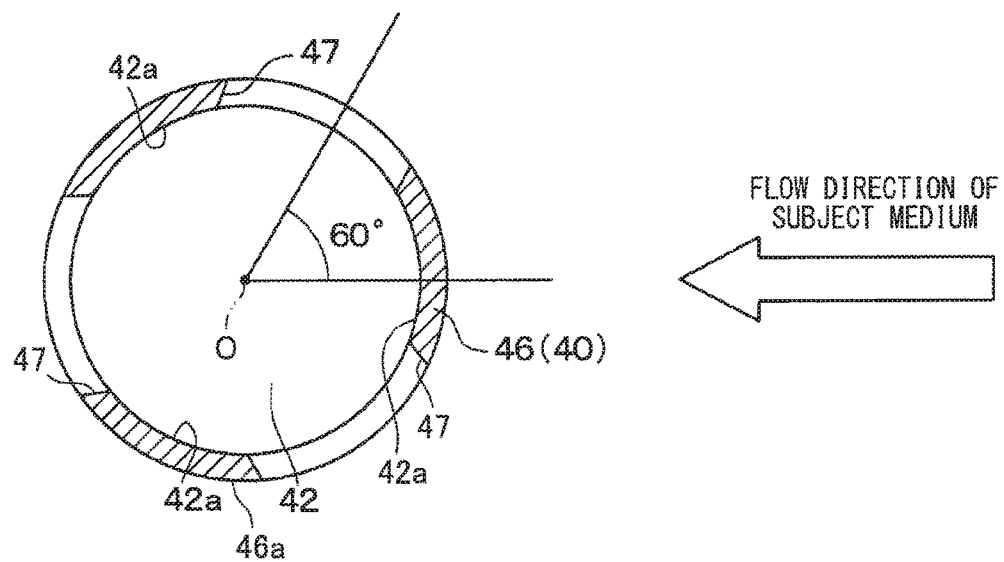
FIG. 7C is a diagram that indicates a positional relationship between the openings at a point C in FIG. 6 and a flow direction of the measurement-subject medium.

With reference to FIGS. 6 and 7A-7C, an angle of screwing is defined as an angle that is defined between the flow direction and a line, which connects between a center (a central axis O) of the projection 46 and a center of the opening 47. Under this definition, in a case where the angle of screwing is 0 degrees (FIG. 7A), the inflow rate can be improved up to 1.5 cc/s. Furthermore, in a case where the angle of screwing is 20 degrees (FIG. 7B), although the inflow rate is reduced, it is possible to obtain the inflow rate of 0.95 cc/s. Furthermore, in a case where the angle of screwing is 60 degrees (FIG. 7C), although the inflow rate is minimized to 0.9 cc/s, a sufficient inflow rate can be achieved in comparison to the previously proposed temperature sensor. Therefore, the responsiveness can be improved. FIGS. 7A to 7C corresponds to a cross section taken along line IV-IV in FIG. 2.

Furthermore, in the present embodiment, the number of the openings 47 is the even number, and these openings 47 are arranged one after another at equal intervals in the circumferential direction. Therefore, at the time of installing the temperature sensor 100 to the installation-subject member 61, the temperature sensor 100 can be easily installed such that at least one of the openings 47 is placed in the visible area of the outer peripheral surface 46a of the projection 46, which is visible at the time of viewing the outer peripheral surface 46a in the flow direction of the measurement-subject medium upon installation of the temperature sensor 100 to the installation-subject member 61, and thereby the installation of the temperature sensor 100 can be eased. In other words, installation variations can be reduced.

Furthermore, the housing 40 is made of the metal material and is kept to have the electric potential that is the same as the electric potential of the installation-subject member 61 by installing the housing 40 to the installation-subject member 61. Therefore, it is possible to limit fluctuation of the electric potential of the housing 40, and thereby it is possible to limit the deterioration in the sensing accuracy of the sensor unit 22, which would be otherwise caused by the fluctuation of the electric potential of the housing 40.

Furthermore, the projection 46 includes the cover portion 43*a*. Therefore, when the measurement-subject medium, which is introduced into the introducing hole 42, collides against the wall surface 42*a*, the flow direction of the measurement-subject medium can be more easily changed to the direction toward the sensor unit 22 in comparison to the case where the cover portion 43*a* is absent, and thereby the responsiveness can be further improved.

The openings 47 are respectively shaped into the ellipse form. Therefore, it is possible to limit concentration of a stress at a predetermined location in comparison to a case where the opening 47 is shaped into a form, such as a rectangular form, which has a corner(s).

Second Embodiment

A second embodiment of the present disclosure will be described. The present embodiment is a modification of the first embodiment where the number of the openings 47 is changed from that of the first embodiment, and the rest of the present embodiment is the same as that of the first embodiment and thereby will not be described here for the sake of simplicity.

Figure 8:
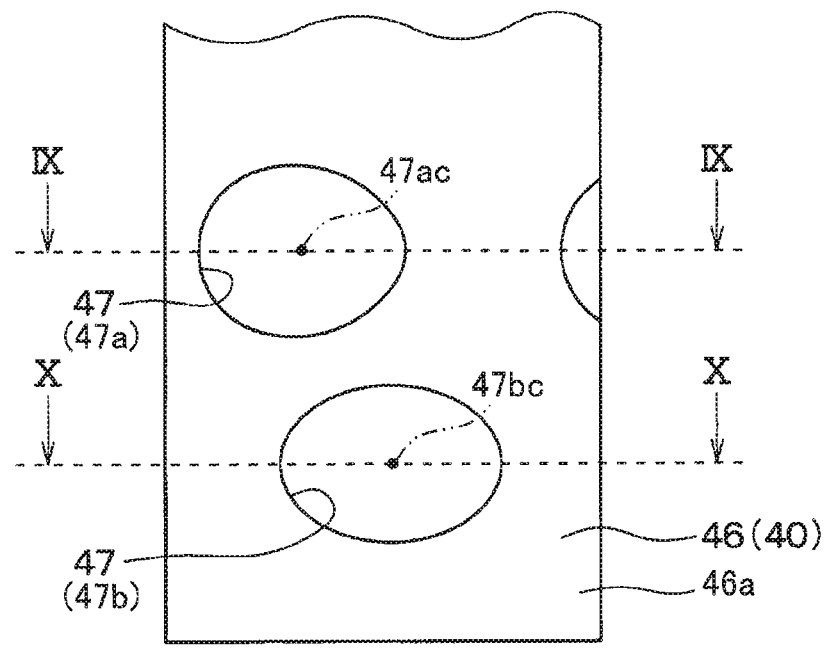
FIG. 8 is a front view of a projection according to a second embodiment of the present disclosure.
Figure 9:
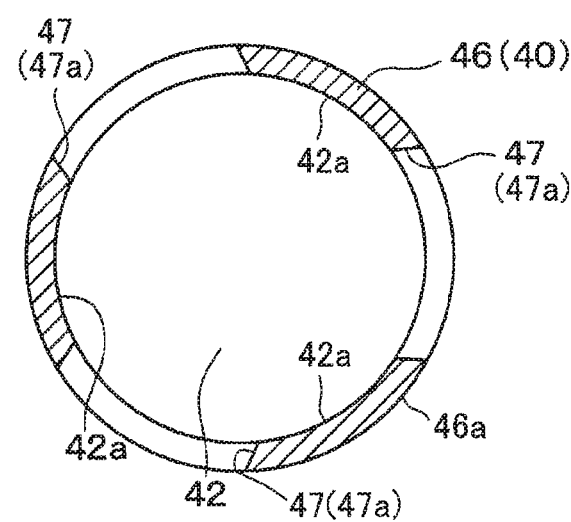
FIG. 9 is a cross-sectional view taken along line IX-IX in FIG. 8.
Figure 10:
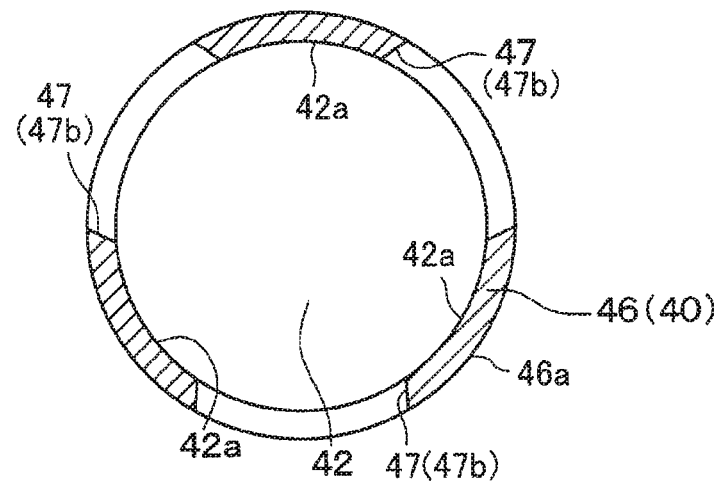
FIG. 10 is a cross-sectional view taken along line X-X in FIG. 8.

In the present embodiment, as shown in FIGS. 8 to 10, one set of three openings 47 is arranged one after another in the circumferential direction, and another set of three openings 47 is arranged one after another in the circumferential direction. Therefore, the two sets of three openings 47 are placed one after another in the axial direction of the projection 46. In the axial direction of the projection 46, a center point of each of the three openings 47 in one of the two sets differs from a center point of a corresponding one of the three openings 47 in the other one of the two sets in the axial direction. Specifically, the three openings 47 are formed in each of the two sets, and the center of each of the three openings 47 in the one set does not coincide with the center of the corresponding one of the three openings 47 in the other set in the axial direction of the projection 46. In other words, the openings 47 are arranged in a staggered configuration (scattered).

More specifically, the plurality of openings 47 of the present embodiment includes a plurality (three in the present embodiment) of primary openings (a first set of openings) 47*a*, which are arranged one after another at equal intervals in the circumferential direction, as shown in FIG. 9, which is a cross-sectional view taken along line IX-IX in FIG. 8, and a plurality (three in the present embodiment) of secondary openings (a second set of openings) 47*b*, which are arranged one after another at equal intervals in the circumferential direction, as shown in FIG. 10, which is a cross-sectional view taken along line X-X in FIG. 8. Furthermore, as shown in FIG. 8, a center point 47*ac* of each of the primary openings 47*a* is deviated in the circumferential direction from a center point 47*bc* of the adjacent one of the secondary openings 47*b*, which is adjacent to the primary opening 47*a* in the axial direction. In the present embodiment, there is described the example where the two sets of openings 47*a*, 47*b* are formed. However, the number of the sets of openings 47, which are spaced from each other in the axial direction, should not be limited two and may be changed to three or more.

With this construction, at least one of the openings 47 (at least one of the primary openings 47*a* and the secondary openings 47*b*) can be more easily placed in the visible area of the outer peripheral surface 46*a* of the projection 46, which is visible at the time of viewing the outer peripheral surface 46*a* in the flow direction of the measurement-subject medium upon installation of the temperature sensor 100 to the installation-subject member 61. Furthermore, even in a case where the installation variation occurs at the time of installing the temperature sensor 100 to the installation-subject member 61, since the centers of the openings 47 of the sets (the circumferential positions of the center points 47*ac* of the primary openings 47*a* and the circumferential positions of the center points 47*bc* of the secondary openings 47*b*) do not coincide with each other, it is possible to reduce the variation in the angle of screwing relative to the opening 47 (positioned at the most upstream side), into which the measurement-subject medium can be most easily introduced.

Third Embodiment

A third embodiment of the present disclosure will be described. The present embodiment is a modification of the first embodiment where a flow direction changing portion (a flow direction changing means) is provided at the cover portion 43*a*, and the rest of the present embodiment is the same as that of the first embodiment and thereby will not be described here for the sake of simplicity.

Figure 11:
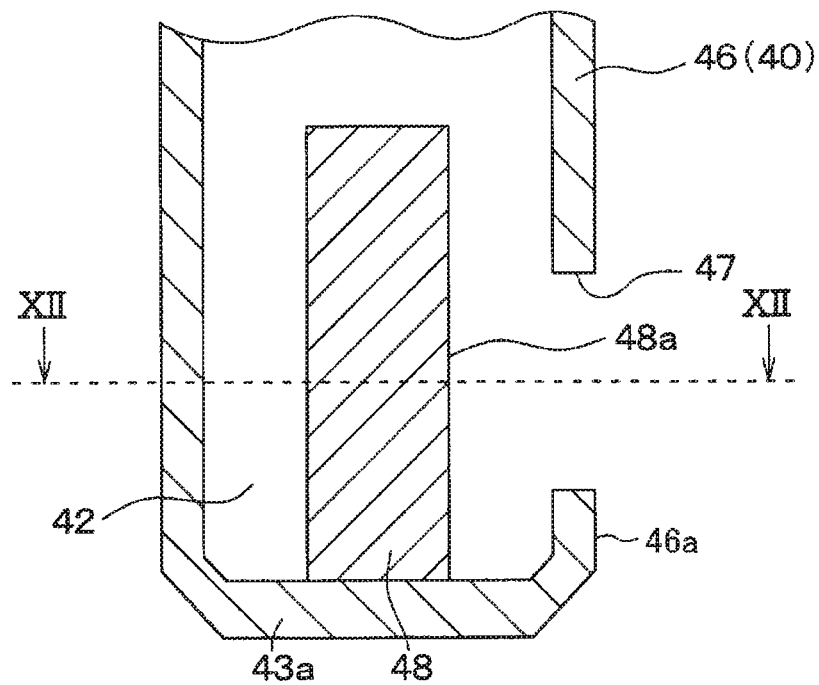
FIG. 11 is a cross-sectional view of a projection according to a third embodiment of the present disclosure.
Figure 12:
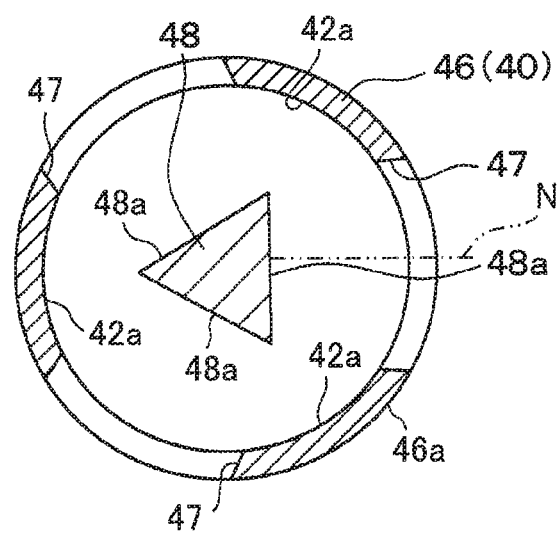
FIG. 12 is a cross-sectional view taken along line XII-XII in FIG. 11.

In the present embodiment, as shown in FIGS. 11 and 12, an introducing member 48, which serves as the flow direction changing portion made of a metal material, such as stainless steel, SUS, aluminum, is placed at the introducing hole 42 side surface of the cover portion 43*a*. Specifically, the introducing member 48 is shaped into a prism form that has side surfaces (one surface) 48*a*. The introducing member 48 is arranged such that one of the side surfaces 48*a* is visually recognizable when the introducing hole 42 is viewed through the opening 47. In other words, the introducing member 48 is arranged such that a normal line N, which is normal to the one of the side surfaces 48*a*, passes through the opening 47. That is, the introducing member 48 is arranged such that the measurement-subject medium, which is introduced through the opening 47, collides against the one of the side surfaces 48*a*. In the present embodiment, the number of the openings 47 is set to be three, and thereby the introducing member 48 is shaped into a triangular prism form. Thus, the introducing member 48 is placed such that the normal line N, which is normal to a corresponding one the three side surfaces 48*a*, passes through the corresponding one of the three openings 47.

In this way, similar to the first embodiment, when the measurement-subject medium is introduced into the introducing hole 42 through the opening 47, the measurement-subject medium collides against the introducing member 48, and thereby, the flow direction of the measurement-subject medium is changed to the direction toward the sensor unit 22. Thus, the advantages, which are similar to those of the first embodiment can be achieved.

In the present embodiment, the flow direction of the measurement-subject medium is changed by the introducing member 48. Therefore, each of the openings 47 may be formed in an opposing wall surface of the projection 46, which is opposed to the introducing member 48. That is, the number of the openings 47 in the projection 46 may be set to four, and these openings 47 may be arranged one after another at equal intervals in the circumferential direction about the central axis O.

Fourth Embodiment

A fourth embodiment of the present disclosure will be described. The present embodiment is a modification of the first embodiment where the sensor unit 22 is placed at the projection 46, and the rest of the present embodiment is the same as that of the first embodiment and thereby will not be described here for the sake of simplicity.

Figure 13:
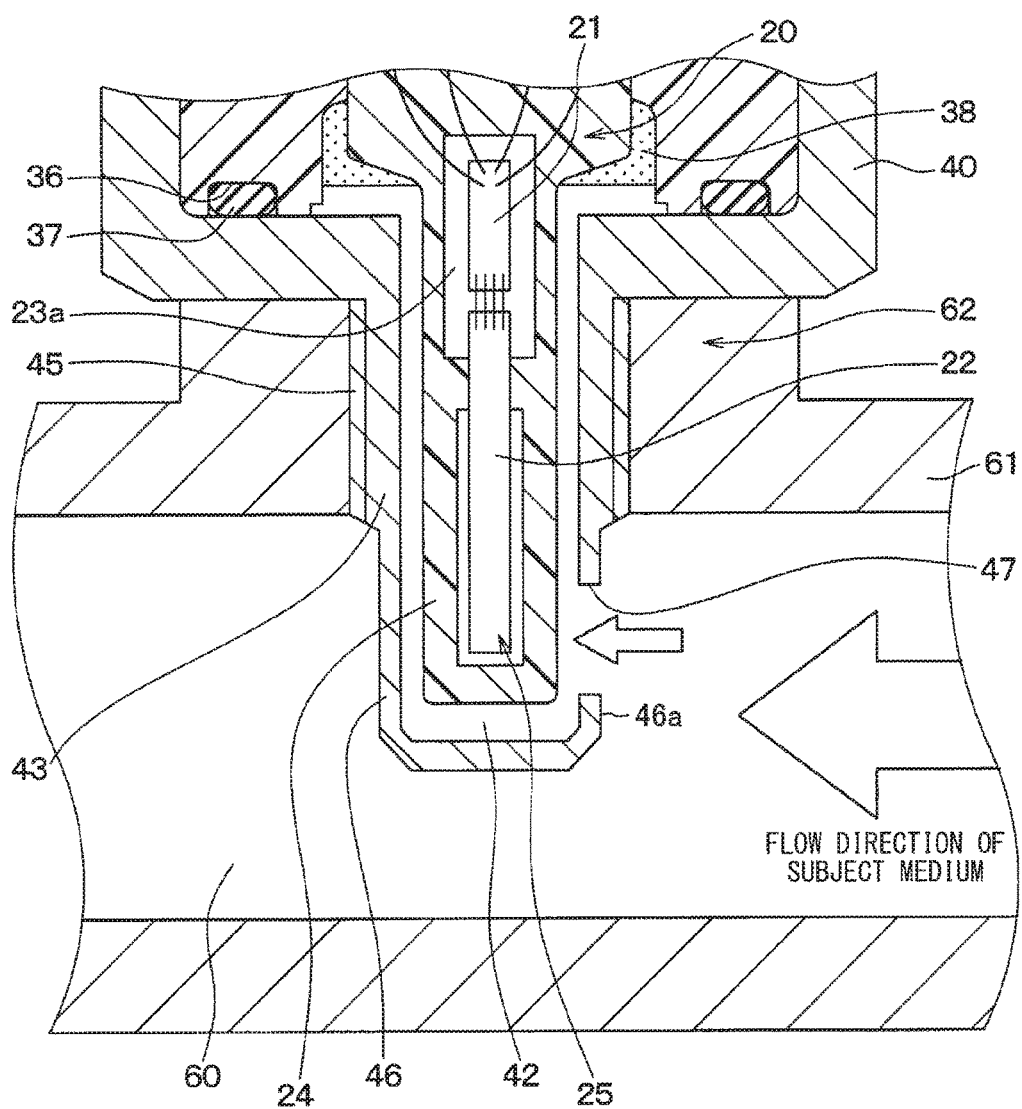
FIG. 13 is a cross-sectional view showing a temperature sensor of a fourth embodiment of the present disclosure installed to the installation-subject member.

In the present embodiment, as shown in FIG. 13, the sensor unit 22 is placed such that the sensing device 25 is visually recognizable when the inside of the introducing hole 42 is viewed from the opening 47. That is, upon installation to the installation-subject member 61, the sensor unit 22 is placed in the inside of the passage 60 and is directly exposed to the measurement-subject medium when the measurement-subject medium is introduced into the introducing hole 42 through the opening 47.

In this way, when the measurement-subject medium is introduced into the introducing hole 42 through the opening 47, the sensor unit 22 is directly exposed to the measurement-subject medium. Thereby, the responsiveness of the sensor unit 22 can be improved. Furthermore, according to the present embodiment, the projection 46 is placed in the inside of the passage 60 in addition to the sensor unit 22, Therefore, in comparison to the case where only the sensor unit 22 is placed in the inside of the passage 60, the projection 46 can implement the function of protecting the sensor unit 22 to limit destruction of the sensor unit 22. The mounting structure of the temperature sensor 100 can be appropriately used in an environment where the flow rate of the measurement-subject medium is slow.

Other Embodiments

The present disclosure should not be limited to the above embodiments, and the above embodiments may be modified in an appropriate manner within the scope of the present disclosure.

In each of the above embodiments, the shape of the respective openings 47 should not be limited to the ellipse form and may be changed to, for example, a circular form or a rectangular form. Furthermore, the number of the openings 47 may be changed in an appropriate manner.

In each of the above embodiments, the shape of the projection 46 (the extending portion 43) may be changed to a bottomed polygonal tubular form that is different from the bottomed cylindrical tubular form. Furthermore, in the first, second and fourth embodiments, the cover portion 43a may be eliminated from the projection 46. Specifically, the projection 46 may be shaped into a tubular form.

Furthermore, in each of the above embodiments, the sensor unit 22 may be modified to sense only the temperature.

Furthermore, in each of the above embodiments, the circuit device 21 and the sensor unit 22 may be integrated into a single chip.

Furthermore, the respective embodiments may be combined in any appropriate combination. For example, the second embodiment may be combined to the third or fourth embodiment to arrange the openings 47 into the staggered configuration.

The invention claimed is:

1. A temperature sensor comprising:
a casing that includes a first case and a second case, which are integrally assembled, wherein the second case has an introducing hole, into which a measurement-subject medium is introduced, and a threaded portion, which is formed in an outer peripheral surface of the second case; and
a sensor unit that is placed in an inside of the casing and senses a temperature of the measurement-subject medium, which is introduced through the introducing hole, wherein:
the threaded portion of the second case is configured to be threadably coupled to a threaded portion of an installation-subject member, which has a passage that conducts the measurement-subject medium, so that the casing is installed to the installation-subject member, and the sensor unit senses the temperature of the measurement-subject medium in the passage of the installation-subject member;
the second case is made of a metal material and is configured to contact the installation-subject member so as to have an electric potential that is the same as an electric potential of the installation-subject member, and the second case includes a projection that projects in such a manner that the projection and the first case are on opposite sides of the threaded portion of the second case, wherein the projection is placed in the passage when the second case is installed to the installation-subject member;
when an outer peripheral surface of the projection is viewed in a flow direction of the measurement-subject medium upon installation of the second case to the installation-subject member, an opening is formed in a visible area of the outer peripheral surface of the projection, while the projection includes a flow direction changing portion that changes a flow direction of the measurement-subject medium, which is introduced from the passage into the introducing hole through the opening, from a direction along the passage to a direction toward the sensor unit, and the projection is shaped into a cylindrical tubular form that extends in a predetermined axial direction;
the opening is one of a plurality of openings, which are formed one after another at equal intervals in a circumferential direction about an axis of the projection in the outer peripheral surface of the projection, while the number of the plurality of openings is an odd number;
the sensor unit is entirely displaced from the plurality of openings in the axial direction away from a distal end portion of the projection; and
the flow direction changing portion is a wall surface that defines the introducing hole and is located at locations, each of which opposes a corresponding one of the plurality of openings in a direction perpendicular to the axis.

2. The temperature sensor according to claim 1, wherein:
the plurality of openings is a plurality of primary openings;
a plurality of secondary openings is formed in the outer peripheral surface of the projection at a location spaced from the plurality of primary openings in the axial direction while the plurality of secondary openings is arranged one after another at equal intervals in the circumferential direction, and the number of the plurality of secondary openings is an odd number; and
a location of a center point of each of the plurality of primary openings is displaced in the circumferential direction from a location of a center point of an adjacent one of the plurality of secondary openings, which is adjacent to the primary opening in the axial direction.

3. The temperature sensor according to claim 1, wherein:
the projection is shaped into a bottomed tubular form and has a cover portion at the distal end portion of the projection, which is distal in a projecting direction of the projection.

4. The temperature sensor according to claim 3, wherein an introducing member, which serves as the flow direction changing portion, is placed on the introducing hole side of the cover portion and includes a surface, while a normal line, which is normal to the surface, passes through the opening.

5. The temperature sensor according to claim 1, wherein the sensor unit senses the temperature of the measurement-subject medium and also senses a pressure of the measurement-subject medium.

6. A temperature sensor installation structure, in which the temperature sensor of claim 1 is installed to the installation-subject member, wherein
the second case is installed to the installation-subject member such that the projection is placed in the passage.

7. A temperature sensor comprising:
a casing that includes a first case and a second case, which are integrally assembled, wherein the second case has an introducing hole, into which a measurement-subject medium is introduced, and a threaded portion, which is formed in an outer peripheral surface of the second case; and
a sensor unit that is placed in an inside of the casing and senses a temperature of the measurement-subject medium, which is introduced through the introducing hole, wherein:
the threaded portion of the second case is configured to be threadably coupled to a threaded portion of an installation-subject member, which has a passage that conducts the measurement-subject medium, so that the casing is installed to the installation-subject member, and the sensor unit senses the temperature of the measurement-subject medium in the passage of the installation-subject member;
the second case is made of a metal material and is configured to contact the installation-subject member so as to have an electric potential that is the same as an electric potential of the installation-subject member, and the second case includes a projection that projects in such a manner that the projection and the first case are on opposite sides of the threaded portion of the second case, wherein the projection is placed in the passage when the second case is installed to the installation-subject member;

when an outer peripheral surface of the projection is viewed in a flow direction of the measurement-subject medium upon installation of the second case to the installation-subject member, an opening is formed in a visible area of the outer peripheral surface of the projection, while the projection includes a flow direction changing portion that changes a flow direction of the measurement-subject medium, which is introduced from the passage into the introducing hole through the opening, from a direction along the passage to a direction toward the sensor unit, and the projection is shaped into a bottomed tubular form and has a cover portion at a distal end portion of the projection, which is distal in a projecting direction of the projection;

the sensor unit is entirely displaced from the plurality of openings in the axial direction away from a distal end portion of the projection; and an introducing member, which serves as the flow direction changing portion, is placed on the introducing hole side of the cover portion and includes a surface, while a normal line, which is normal to the surface, passes through the opening.

8. The temperature sensor according to claim 7, wherein the sensor unit senses the temperature of the measurement-subject medium and also senses a pressure of the measurement-subject medium.

9. A temperature sensor installation structure, in which the temperature sensor of claim 7 is installed to the installation-subject member, wherein
the second case is installed to the installation-subject member such that the projection is placed in the passage.

* * * * *